United States Patent Office 3,344,170
Patented Sept. 26, 1967

3,344,170
HYDROCARBONYLENE BIS(ALKYLNITRO-
CARBAMATES)
Stanley J. Strycker, Midland, Mich., assignor to The Dow
Chemical Company, Midland, Mich., a corporation of
Delaware
No Drawing. Filed Sept. 10, 1963, Ser. No. 307,787
5 Claims. (Cl. 260—482)

The present invention is directed to alkylcarbamate compound corresponding to the formula

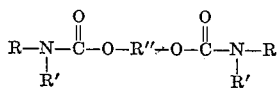

and to methods and compositions employing such compound for the modification and alteration of the growth of numerous organisms. In this and succeeding formulae, R represents alkyl being of from 1 to 4, inclusive, carbon atoms; R' represents a member selected from the group consisting of hydrogen and nitro; and R" represents a hydrocarbonylene moiety selected from the group consisting of alkylene being of from 2 to 10, inclusive, carbon atoms, 2-butenylene, cyclohexylene and cyclohexylenedimethylene. These novel compounds are oils or crystalline solid materials which are somewhat soluble in many common organic solvents and of very low solubility in water.

In the present specification and claims, the term "alkylene" is employed to refer to straight-chain divalent radicals as well as branched-chain divalent radicals. Representative alkylene radicals include ethylene, propylene, tetramethylene, 2-ethyltrimethylene, hexamethylene, nonamethylene, 1,8-dimethyloctamethylene, and heptamethylene.

The compounds of the present invention wherein R' represents hydrogen are prepared by reacting a hydrocarbondiol compound corresponding to the formula

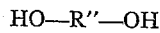

with a loweralkylisocyanate compound corresponding with the formula

The reaction is conveniently carried out in the presence of an inert reaction medium, preferably, an organic liquid. Suitable organic liquids are benzene, chloroform, and tetrahydrofuran. The amounts of the reactants to be employed are not critical, some of the desired product compound being obtained when employing the reactants in any amounts. However, the reaction consumes the reactants in amounts which represent one molecular proportion of hydrocarbondiol compound and two molecular proportions of the loweralkylisocyanate compound, and the use of amounts which represent such proportions, or approximately such proportions, is preferred. The reaction takes place smoothly at temperatures between 25° and 80° C., and preferably, at temperatures between 75° and 80°, with the production of the desired product.

In carrying out the reaction, the reactants are contacted together in any convenient fashion and maintained for a period of time in the reaction temperature range to complete the reaction. Some of the desired product compound is formed immediately upon the contacting of the reactants; however, the yield of the desired product compound is increased by permitting the reaction mixture to stand for a period of time. The rate at which the reaction takes place is increased by employing in the reaction mixture a small and catalytic amount of a tertiary amine, such as triethylamine, and the use of such tertiary amine is preferred.

Following the completion of the reaction, the product compound is separated from the reaction mixture by filtration and/or the reaction medium removed by distillation or evaporation under reduced pressure. As a result of such operations, the desired hydrocarbonylene bis(alkylcarbamate) compound (R' being hydrogen) is obtained as a residue. This residue can be used without purification or can be purified by conventional procedures, such as, for example, washing with water, washing with inert liquid reaction medium, or recrystallization.

The remaining compounds of the present invention, where R' represents nitro, are prepared by nitration of the hydrocarbonylene bis(alkylcarbamate) compound. The nitration, which term is employed in the customary sense to mean the introduction of an —NO$_2$ group into an organic compound, can be effected by a nitrating agent, such as, for example, nitric acid, fuming nitric acid, a mixture of sulfuric and nitric acid, other mixtures having nitric acid as a major component, nitronium tetrafluoroborate (that is, NO$_2$BF$_4$) and dinitrogen pentoxide. Preferably, the fuming nitric acid is employed as nitrating agent. The nitration is conveniently carried out in the presence of an inert reaction medium, preferably, an organic liquid. Organic liquids which can be used include acetic anhydride, methylene chloride, and benzene. However, higher yields of the product result from the use of fuming nitric acid as both nitrating agent and reaction medium, and such practice is preferred.

The amounts of the hydrocarbonylene bis(alkylcarbamate) compound and nitrating agent to be employed are not critical, some of the desired product compound being obtained when employing the reactants in any amounts. The reaction consumes the reactants in amounts which represent one molecular proportion of hydrocarbonylene bis(alkylcarbamate) compound and two molecular proportions of nitrating agent. However, the use of hydrocarbonylene bis(alkylcarbamate) in an amount which represents one molecular proportion and nitrating agent in an amount which represents an excess of the two molecular proportions consumed, such as five to ten molecular proportions of nitrating agent, is preferred.

The reaction takes place smoothly at temperatures between —20° and 25° C. Higher temperatures can be employed; however, the use of higher temperatures tends to result in decomposition of the product compound as it is formed in situ. Preferably, the reaction is conducted at temperatures of about —5 to 10° C. The reaction is exothermic; it is therefore preferable to provide the reaction mixture with means to maintain the temperature of the reaction mixture without such undue temperature rise as would bring the mixture to a temperature higher than those hereinbefore described.

In carrying out the reaction, the reactants are contacted together in any convenient fashion and maintained for a period of time in the reaction temperature range to complete the reaction. Some of the desired hydrocarbonylene bis(alkylnitrocarbamate) product compound is formed immediately upon the contacting of the reactant; however, the yield of the desired product compound is increased by permitting the reaction mixture to stand for a period of time.

Upon the completion of the reaction, the desired product compound can be separated from the reaction mixture by filtration and/or the reaction medium removed by distillation or evaporation under reduced pressure. As a result of these operations, the product is separated from the reaction mixture as a residue. However, when the desired product compound is soluble in the reaction mixture, the product can be obtained as a precipitate by dilution of the reaction mixture with a quantity of water. Such dilution also serves to lessen the chance that undesirable side reactions will take place. The desired product compound is then obtained as a residue by filtration of the diluted reaction mixture.

The product residue obtained by separation of the product from the reaction mixture can be used without purification or can be purified by conventional procedures, such as, for example, washing with water, washing with inert liquid reaction medium, or recrystallization. Solvents which can be employed as media for the recrystallization of product include isopropanol, cyclohexane, and ethanol.

The following examples represent the best method known to the inventor to practice the present invention and, without more, will enable those skilled in the art to practice the present invention.

*Example I.—Ethylene bis(methylcarbamate)*

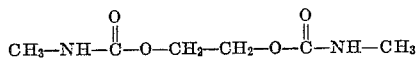

Ethylene glycol (9.3 grams; 0.15 mole) was mixed, with stirring, with 100 milliliters of benzene. To the resulting mixture was thereafter added, with stirring, 15.0 grams of methylisocyanate (0.32 mole), and 1 milliliter of triethylamine. The reaction mixture was then heated to a temperature of about 80° C. for a period of 1 hour. Thereafter, the heated reaction mixture was permitted to cool for a period of time, during which the ethylene bis(methylcarbamate) product crystallized in the reaction mixture. The crystalline product was separated from the reaction mixture by filtration and the separated product dried. After several recrystallizations from methyl ethyl ketone, the product was found to melt at 128–130° C. and to have an actual nitrogen content of 15.86 percent as compared with a theoretical nitrogen content of 15.90.

*Example II.—1,4-cyclohexylenedimethylene bis (butylcarbamate)*

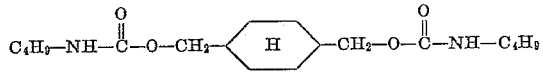

In a manner similar to that of Example I, 1,4-cyclohexylenedimethylene bis(butylcarbamate) is prepared by the reaction of 1,4-cyclohexanedimethanol with butylisocyanate, and thereafter separated as a product residue. The purified product has a molecular weight of 342.5. It is a white crystalline solid which melts at 118–120° C.

*Example III.—Hexamethylene bis(methylcarbamate)*

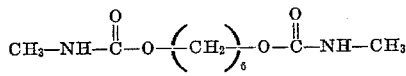

1,6-hexanediol (18.0 grams; 0.15 mole) was added, with stirring, to 200 milliliters of chloroform. To the resulting mixture was thereafter added 20 grams of methylisocyanate (0.35 mole) and two milliliters of triethylamine. The resulting reaction mixture was heated to a temperature of about 60° C. for a period of time. As a result of these operations, there was obtained the hexamethylene bis(methylcarbamate) product as a crystalline residue. This residue was separated from the reaction mixture, and the separated product purified by recrystallization from benzene. The purified product was found to melt at 123–123.5° C. and to have an actual nitrogen content of 12.02 percent as compared to a theoretical nitrogen content of 12.06 percent.

In a similar manner, other products of the present invention are prepared as follows:

Hexamethylene bis(ethylcarbamate) (melting at 95–97.5° C.) by reacting together 1,6-hexanediol and ethylisocyanate.

Trimethylene bis(butylcarbamate) (a white crystalline solid melting at 99–102° C.) by reacting together 1,3-propanediol and butylisocyanate.

Ethylene bis(isopropylcarbamate) (molecular weight of 232.3) by reacting together ethylene glycol and isopropylisocyanate.

Tetramethylene bis(methylcarbamate) (melting at 138–139.5° C. and having an actual nitrogen content of 13.77 as compared to a theoretical nitrogen content of 13.72) by reacting together 1,4-butanediol with methylisosyanate.

Tetramethylene bis(butylcarbamate) (melting at 111.5–112.5° C.) and having the following combustion analysis:

| Element | Percent of Element | |
|---|---|---|
| | Calculated | Found |
| Carbon | 58.30 | 58.31 |
| Hydrogen | 9.78 | 9.78 |
| Nitrogen | 9.72 | 9.75 | by reacting together 1,4-butanediol with butylisocyanate.

Propylene bis(methylcarbamate) (as a white crystalline solid melting at 74–76° C.) by reacting together 1,2-propanediol and methylisocyanate.

1,4 - cyclohexylenedimethylene bis(methylcarbamate) (melting at 149–150° C.) by reacting together 1,4-cyclohexanedimethanol and methylisocyanate.

Propylene bis(sec-butylcarbamate) (having a molecular weight of 274.4) by reacting together 1,2-propanediol with sec-butylisocyanate.

1,2-cyclohexylene bis(butylcarbamate) (trans form) (a white crystalline product melting at 70–72° C.) by reacting together trans 1,2-cyclohexanediol and butylisocyanate.

Tetramethylene bis(ethylcarbamate) (melting at 120–121° C.) by reacting together 1,4-butanediol with ethylisocyanate.

1,4-cyclohexylene bis(methylcarbamate) by reacting together 1,4-cyclohexanediol and methylisocyanate. The product is separated into its cis and trans forms; the cis melts at 168–170° C.; the trans, at 203–206° C.

1,2 - cyclohexylene bis(methylcarbamate) (molecular weight of 230.3) by reacting together 1,2-cyclohexanediol with methylisocyanate. The product melts at 143–145° C.

Ethylene bis(butylcarbamate) (as a crystaline solid melting at 105–106.5° C.) by reacting together ethylene glycol and butylisocyanate.

2-butenylene bis(methylcarbamate) (as a white crystalline solid melting at 88–90° C.) by reacting together 2-butene-1,4-diol with methylisocyanate.

Decamethylene bis(methylcarbamate) (melting at 126–128° C.) by reacting together 1,10-decanediol and methylisocyanate.

Trimethylene bis(ethylcarbamate) (a white crystalline solid melting at 104–106° C.) by reacting together 1,3-propanediol and ethylisocyanate.

Pentamethylene bis(methylcarbamate) (melting at 120–121.5° C.) by reacting together 1,5-pentanediol with methylisocyanate.

3-ethyl-1,6 - hexamethylene bis(tert-butylcarbamate) (molecular weight of 344.5) by reacting together 3-ethyl-1,6-hexanediol with tert-butylisocyanate.

Eethylene bis(ethylcarbamate) (a white crystallline solid melting at 97–98.5° C.) by reacting ethylene glycol and ethyl isocyanate.

Decamethylene bis(ethylcarbamate) (molecular weight of 316.4) by reacting together 1,10-decanediol with ethylisocyanate.

2-butenylene bis(butylcarbamate) by reacting together 2-butene-1,4-diol and butylisocyanate. The product, a solid material, melts at 66–67.5° C.

Trimethylene bis(methylcarbamate) (melting at 134–135° C.) by reacting together 1,3-propanediol with methylisocyanate.

Pentamethylene bis(ethylcarbamate) (melting at 91–92° C.) by reacting together 1,5-pentanediol and ethyl isocyanate.

Decamethylene bis(butylcarbamate) (melting at 110–112° C.) by reacting together 1,10-decanediol and butylisocyanate.

*Example IV.—Hexamethylene bis(methylnitrocarbamate)*

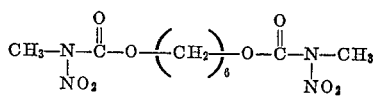

A quantity of fuming nitric acid, as a 90 percent solution having a specific gravity of 1.5, was cooled to a temperature of −5° C. Hexamethylene bis(methylcarbamate) (15.0 grams; 0.06 mole), prepared according to the procedures of Example 3, was added portionwise over a period of time to 125 milliliters of the fuming nitric acid. Thereafter, the resulting reaction mixture was maintained at a temperature of about 0° C. for a period of about 1 hour, after which time the reaction mixture was mixed with 1 liter of ice water. The hexamethylene bis(methylnitrocarbamate) product crystallized in the aqueous mixture as a white crystalline material. This product material was separated from the aqueous mixture by filtration. The product, after several recrystallizations from isopropanol, melts at 48–49° C.

*Example V*

In procedures essentially as those employed in Example 4, propylene bis(methylnitrocarbamate) is prepared by the reaction of propylene bis(methylcarbamate) and fuming nitric acid. The product is a liquid having a refractive index $n$ measured at 25° C. for the D line of sodium light of 1.4868. The product has the following structural formula:

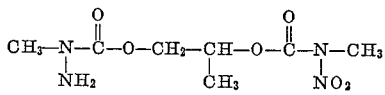

*Example VI.—Tetramethylene bis(ethylnitrocarbamate)*

A quantity of fuming nitric acid was cooled to a temperature of −3° C., and tetramethylene bis(ethylcarbamate) (10 grams; 0.04 mole) was added portionwise to 75 milliliters of the fuming nitric acid. The addition was carried out in such manner that the temperature of the resulting reaction mixture did not rise above 5° C. The reaction mixture was thereafter permitted to stand, with stirring, for a period of 2 hours, during which time the temperature of the reaction mixture reached 10° C. The reaction mixture was then poured into a quantity of water at a temperature of about 0° C., during which procedure the tetramethyl bis(ethylnitrocarbamate) product formed in the solution as a white crystalline solid. The product was separated from the solution by filtration and thereafter dried. After several recrystallizations from cyclohexane, the product was found to melt at 44–45° C.

Other compounds of the present invention are similarly prepared.

From tetramethylene bis(methylcarbamate) and fuming nitric acid, tetramethylene bis(methylnitrocarbamate) as a white crystalline solid melting at 96–97° C.

From pentamethylene bis(methylcarbamate) and nitric acid, pentamethylene bis(methylnitrocarbamate) product having a refractive index $n$ measured at 25° C. for the D line of sodium light of 1.4845.

From 1,6-dimethylhexamethylene bis(methylcarbamate) and fuming nitric acid, 1,6-dimethylhexamethylene bis(methylnitrocarbamate) product having a molecular weight of 406.5.

From tetramethylene bis(butylcarbamate) and fuming nitric acid, tetramethylene bis(butylnitrocarbamate). The product is a liquid having a refractive index $n$ measured at 25° C. for the D line of sodium light of 1.4696.

From trimethylene bis(methylcarbamate) and fuming nitric acid, trimethylene bis(methylnitrocarbamate) product melting at 52–53° C.

From hexamethylene bis(ethylcarbamate) and fuming nitric acid, hexamethylene bis(ethylnitrocarbamate) as a white crystalline product melting at 68–69° C.

From ethylene bis(ethylcarbamate) and fuming nitric acid, ethylene bis(ethylnitrocarbamate) product having a refractive index $n$ measured at 25° C. for the D line of sodium light of 1.4836.

From decamethylene bis(methylcarbamate) and a mixture of sulfuric and nitric acids, decamethylene bis(methylnitrocarbamate) product. The product is a solid white in color, which melts at 50–51° C.

From ethylene bis(butylcarbamate) and fuming nitric acid, a liquid ethylene bis(butylnitrocarbamate) product having a refractive index $n$ measured at 25° C. for the D line of sodium light of 1.4750.

From 1,2-cyclohexylene bis(methylcarbamate) and fuming nitric acid, 1,2-cyclohexylene bis(methylnitrocarbamate) product as a white crystalline solid melting at 62–64° C.

From trimethylene bis(ethylcarbamate) and fuming nitric acid, a white crystalline trimethylene bis(ethylnitrocarbamate) product melting at 43.5–44.5° C.

From 1,4-cyclohexylenedimethylene bis(butylcarbamate) and fuming nitric acid, 1,4-cyclohexylenedimethylene bis(butylnitrocarbamate) product melting at 82–83° C. The product has the following structural formula

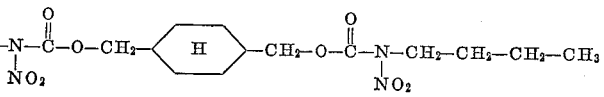

From decamethylene bis(butylcarbamate) and fuming nitric acid, decamethylene bis(butylnitrocarbamate) product, a liquid having a refractive index $n$ measured at 25° C for the D line of sodium light of 1.4715.

From 2-butenylene bis(methylcarbamate) and fuming nitric acid, 2-butenylene bis(methylnitrocarbamate) product having a refractive index $n$ measured at 25° C. for the D line of sodium light of 1.5070.

From 1,4-cyclohexylenedimethylene bis(methylcarbamate) and a mixture of nitric and sulfuric acids, 1,4-cyclohexylenedimethylene bis(methylnitrocarbamate) product melting at 92–93.5° C.

From pentamethylene bis(ethylcarbamate) and fuming nitric acid, pentamethylene bis(ethylnitrocarbamate) product. The product has a molecular weight of 336.3 and is a yellow liquid at room temperature of about 25° C.

From 1,2-cyclohexylene bis(butylcarbamate) and fuming nitric acid, 1,2-cyclohexylene bis(butylnitrocarbamate) product having a refractive index $n$ measured at 25° C. for the D line of sodium light of 1.4846.

From 1,3-cyclohexylenedimethylene bis(sec-butylcarbamate) and fuming nitric acid, 1,3-cyclohexylenedimethylene bis(sec-butylnitrocarbamate) product having a molecular weight of 432.5.

From trimethylene bis(butylcarbamate) and fuming nitric acid, trimethylene bis(butylnitrocarbamate) product. The product is a yellow liquid having a molecular weight of 364.35.

From 1,4-cyclohexylene bis(methylcarbamate) and fuming nitric acid, 1,4-cyclohexylene bis(methylnitrocarbamate) as a white crystalline product melting at 182–183.5° C.

From 2-butenylene bis(butylcarbamate) and fuming nitric acid, 2-butenylene bis(butylnitrocarbamate) product having a refractive index $n$ measured at 25° C. for the D line of sodium light of 1.4850.

From heptamethylene bis(isopropylcarbamate) and fuming nitric acid, heptamethylene bis(isopropylnitrocarbamate) product having a molecular weight of 392.4.

Those compounds of the present invention wherein R″ represents alkylene are particularly useful and constitute a preferred embodiment of the present invention. Another preferred group of compounds of the present invention are those wherein R' represents nitro.

It has been discovered that the compounds of the present invention are useful in a wide variety of operations for the modification and alteration of the growth of numerous organisms such as, for example, mite, tick, helminth, bacterial, fungal, plant, and insect organisms. In such operations, a growth altering and/or pesticidal amount of at least one of the alkylcarbamate compounds is employed.

It has been further discovered that the exposure of a viable form of plants to the action of the alkylcarbamate compound gives rise to different responses depending upon the nature of the plant, the stage of growth or maturity of the plant, and the dosage of alkylcarbamate compound at which the exposure is carried out. Thus, the application to plants, plant parts, and their habitats of a herbicidal amount of alkylcarbamate compound suppresses and inhibits the growth of seeds, emerging seedlings, and established vegetation. The application to plants of a lesser and growth-stimulant amount of alkylcarbamate compound imparts beneficial effects to the growth of the plants, such as, for example, increased size of produce, or of yield of crop; earlier plant maturation; improved qualitative content of plant parts, such as protein content in legumes and in members of the Gramineae family; delayed senescence; and the like. The application of alkylcarbamate compound to plants may be made by contacting the compound with seeds, seedlings, established vegetation, roots, stems, flowers, fruits, and the like, or by applying the compound to soil.

The application to the organisms or their habitats of a growth altering amount of alkylcarbamate compound is essential and critical for the practice of the present invention. The exact dosage to be supplied is dependent upon the organism, the stage of growth thereof, and, in many instances, the particular part of the organism to which the alkylcarbamate compound is applied. Where parasite control is desired, the compounds are employed in parasiticidal amounts. When the invention is employed to modify and alter the growth of plants, and plant parts, the compounds are employed in plant growth altering amounts. For example, alkylcarbamate compound can be applied to plants, plant parts and their habitats in herbicidal dosages. In foliar applications of herbicidal dosages, liquid compositions containing from about 4,000 or less to 20,000 or more parts by weight per million parts of ultimate composition can be conveniently applied to plant surfaces. In the application to growth media of herbicidal dosages of alkylcarbamate compound, good results are obtained when the compound is supplied to the growth media in an amount of from about 5 to 300 parts or more by weight per million parts by weight of the media. Where the growth media is soil, good results are obtained when the alkylcarbamate compound is distributed therein at a rate of from about 20 or less to 300 pounds or more per acre and through such a cross section of the soil as to provide for the presence therein of alkylcarbamate compound in an amount of from 20 to 300 parts per million. In such application, it is desirable that the compound be distributed to a depth of at least 0.5 inch and at a substantially uniform dosage of at least 10 pounds per acre inch of soil. The weathering action of the sun, rain, and possibly the decomposition of the agents by the action of soil organisms, eventually reduces their concentration in soil, or other growth media.

In other applications of the present alkylcarbamate compounds, the active agents are employed in plant growth stimulating dosages. In such operations, good results are obtained when the compounds are applied to plants and plant parts in dosages of from 0.001 or less to 20 or more pounds per acre. In other similar operations, liquid compositions containing from about 1 to 4,000 or more parts per million can be conveniently applied to the plant surfaces. In the treatment of seed to stimulate seedling growth and obtain improved yield of the plants produced by such seeds, good results are obtained when the seeds are treated with from about 1 to 250 grams (about 0.035 to 9 ounces) of compound per hundred pounds of seed.

The method of the present invention can be carried out by exposing the organisms or their habitats to the action of the unmodified compounds. The present method also comprehends the employment of a liquid or dust composition containing one or more of the present compounds as an active component. In such usage, the active component is modified with one or a plurality of additaments or adjuvants for organism growth modification compositions, such as water or other liquid carriers, surface-active dispersing agents, and finely divided solids. Depending upon the concentration of active compound, such augmented compositions are adapted to be applied to the organisms and their habitats, or to be employed as concentrates and subsequently diluted with additional inert carrier to produce the ultimate treating compositions. In compositions where the adjuvant or helper is a finely divided solid, a surface-active agent or a liquid additament, the carrier cooperates with the active component so as to facilitate the invention, and to obtain an improved and outstanding result.

In addition, the present method also comprehends the employment of aerosol compositions containing one or more of the present compounds as an active agent. Such compositions are prepared according to conventional methods wherein the agent is dispersed in a solvent and the resultant dispersion mixed with a propellant in liquid state. Such variables as the particular compound to be used and the particular substrate to be treated will determine the identity of the solvent and the concentration of the active compound. The solvent should be of low phytotoxicity, such as water, acetone, isopropanol or 2-ethoxyethanol, in compositions to be applied to plants for plant stimulation and crop yield improvement.

The exact concentration of the active compound to be employed in the treating compositions is not critical and can vary considerably provided the required dosage of effective agent is supplied upon the organism or its habitat. The concentration of the active agent in liquid compositions employed to supply the desired dosage generally is from 0.0001 to 50 percent by weight. Concentrations of up to 95 percent by weight are oftentimes conveniently employed. In dusts, the concentration of active component can be from about 0.01 to 20 percent by weight. In compositions to be employed as concentrates, the active component can be present in a concentration in an amount of from about 5 to 98 percent by weight.

The quantity of the composition applied is not critical provided only that the required dosage of active component is applied in sufficient of the finished composition to cover adequately the organism or habitat to be treated.

Liquid compositions containing the desired amount of active component can be obtained by dissolving the compound in an organic liquid carrier or by dispersing the active agent in water. With the water-soluble agents, the dispersion is facilitated and conveniently accomplished with the aid of a suitable surface-active dispersing agent such as an ionic or non-ionic emulsifying agent. The aqueous compositions can contain one or more water-immiscible solvents for the active agent. In such compositions, the carrier can comprise an aqueous emulsion, that is, a mixture of water-immiscible solvents, emulsifying agent and water. The choice of dispersing and emulsifying agent and the amount thereof employed is dictated by the nature of the composition type and by the ability of the agent to facilitate the dispersion of the active agent in the carrier to produce the desired composition. Dispersing and emulsifying agents which can be employed in the compositions include the condensation products of alkylene oxides with phenols and organic acids, alkyl aryl sulfonates, polyoxyethylene derivatives of sorbitan esters, complex alcohols, mahogany soaps and the like.

In the preparation of dust compositions, the active component is dispersed in and on a finely divided solid which is non-reactive with the active agents, such as talc, chalk, gypsum and the like. In such operations, the finely divided carrier is mixed with the active compound or a volatile organic solvent solution thereof. Similarly, dust compositions containing the active compounds are prepared from various of the solid surface-active dispersing agents, such as bentonite, fuller's earth, attapulgite and other clays. Depending upon the proportion of ingredients, the dust compositions can be employed as concentrates and subsequently diluted with additional solid surface-active dispersing agent or with talc, chalk, or gypsum and the like to obtain the desired amount of active component in compositions adapted to be applied to the organisms or their habitats. Also, such concentrated dust compositions can be dispersed in water with or without the aid of a dispersing agent, to form spray mixtures. Preferred finely divided solid adjuvants include those which are of low phytotoxicity to plants and plant parts.

When operating in accordance with the present invention, the active agents or compositions containing the agents are applied to the organisms or their habitats in growth-modifying amounts in any convenient fashion, for example, with power dusters, boom and hand sprayers, and spray dusters. In another procedure, the agents or compositions containing the same are drilled into soil and further distributed therein in conventional procedures.

The following examples illustrate the best manner of employing the present invention, and, without more, will enable those skilled in the art to employ the method of the present invention.

Example VII

Compositions containing the compounds of the present invention are prepared in various procedures. In one procedure, four parts by weight of one of the alkyl-carbamate compounds, 0.08 part of sorbitan trioleate (Span 85) and 0.02 part of sorbitan monolaurate polyoxyethylene derivative (Tween 80) are dispersed in forty milliliters of acetone to produce a concentrate composition in the form of a water-dispersible liquid.

In another procedure, one of the alkylcarbamate compounds is formulated in water with an alkyl aryl sulfonate (Nacconol NR) and a substituted benzoid alkyl sulfonic acid (Daxad No. 27) to produce aqueous compositions. In such operations, the materials are ballmilled together to produce compositions containing varying amounts of one of active agents, 300 parts by weight of Nacconol NR and 300 parts by weight of Daxad No. 27 per million parts by weight of ultimate aqueous mixture. In this manner, ballmilled compositions are prepared from all of the alkylcarbamate compounds of the above examples.

Example VIII

Liquid compositions are prepared with trimethylene bis(butylcarbamate), pentamethylene bis(ethylcarbamate), and 1,2-cyclohexylene bis(butylcarbamate) in the ballmilling procedure described in Example 7 and each containing an amount of one of the named active agents.

Also, concentrate compositions are prepared as described in Example 7 from tetramethylene bis(butylnitrocarbamate) and propylene bis(methylnitrocarbamate) and the resulting concentrates dispersed in water to prepare aqueous compositions each containing an amount of one of the named active agents.

These compositions are employed for the treatment of seed beds and sandy loam soil of good nutrient content. Prior to the treatment, the soil is seeded with the seeds of peas (*Pisum sativum*) and beans (*Phaseolus vulgaris*). In the treating operations, the composition is applied as a soil drench and at a rate of about 0.434 acre inch of aqueous compositions per acre to supply varying amounts of one of the compounds per acre and varying concentrations of one of the compounds in the soil. Other areas similarly seeded with the named plant species are left untreated to serve as checks. Following the treating operations, the seed beds are observed at regular intervals to ascertain any appreciable effects upon the germination of the seeds and the growth of the seedlings.

Two weeks following the treating operations, the average height of the plants above the ground line in the treated seed buds is measured and compared with the average height of the plants in the untreated seed beds. At the time that the measurements are taken, all of the treated and untreated seed beds support abundant stands of healthy plants of the named plant species. The results of the measurements, the agents, and the concentrations and dosages at which the agents are employed are set forth in the following table.

| Test Compounds | Concentration of Test Compound in Composition | Dosage of Test Compound | | Percent Greater Stem Elongation of Plants from Treated Soil than from Untreated Soil | |
|---|---|---|---|---|---|
| | | Pounds per acre | Parts per million by weight of soil | Peas | Beans |
| Trimethylene bis(butylcarbamate) | 0.0086 | 1 | 1.6 | 58 | 25 |
| Pentamethylene bis(ethylcarbamate) | 0.0086 | 1 | 1.6 | 25 | 69 |
| 1,2-cyclohexylene bis(butylcarbamate) | 0.0086 | 1 | 1.6 | 25 | 43 |
| Tetramethylene bis(butylcarbamate) | 0.0432 | 5 | 8 | 25 | 62 |
| Propylene bis(methylnitrocarbamate) | 0.0086 | 1 | 1.6 | 114 | 30 |
| | 0.0432 | 5 | 8 | 50 | 40 |

Example IX

Liquid compositions are prepared with hexamethylene bis(methylcarbamate), trimethylene bis(methylcarbamate), ethylene bis(butylcarbamate), trimethylene bis(butylcarbamate), pentamethylene bis(ethylcarbamate), trimethylene bis(methylnitrocarbamate), and 1,4-cyclohexylene bis(methylcarbamate), in the ballmilling procedure described in Example 7 and each containing 1,000 parts of one of the named active agents per million parts by weight of ultimate composition.

Also, concentrate compositions are prepared as described in Example 7 from tetramethylene bis(methylcarbamate), ethylene bis(butylnitrocarbamate), and propylene bis(methylnitrocarbamate), and the resulting concentrates dispersed in water to prepare aqueous compositions each containing 1,000 parts of one of the named active agents per million parts by weight of ultimate composition.

These compositions are employed in post emergent applications for the treatment of bean plants (*Phaseolus vulgaris*). In the treating operations, the compositions are applied as foliage sprays to plots of the bean plants. At the time of the applications, the plants are from two to four inches in height. The treatments are carried out with conventional spraying equipment, the applications being made to the point of run-off. Similar plots of bean plants are left untreated to serve as checks.

Two weeks following the treating operations, the average height above the ground line of the treated bean plants is measured and compared with the average height above the ground line of the untreated bean plants. At the time the measurements are taken, all of the treated and untreated plots support stands of bean plants in healthy condition. The compounds employed and the results of the measurements are set forth in the following table.

| Test compound: | Percent greater stem elongation of treated bean plants than of untreated bean plants |
|---|---|
| Hexamethylene bis(methylcarbamate) | 40 |
| Trimethylene bis(methylcarbamate) | 40 |
| Ethylene bis(butylcarbamate) | 50 |
| Trimethylene bis(butylcarbamate) | 38 |
| Pentamethylene bis(ethylcarbamate) | 45 |
| Trimethylene bis(methylnitrocarbamate) | 50 |
| 1,4-cyclohexylene bis(methylcarbamate) | 55 |
| Tetramethylene bis(methylcarbamate) | 40 |
| Ethylene bis(butylnitrocarbamate) | 52 |
| Propylene bis(methylnitrocarbamate) | 50 |

*Example X*

Aqueous spray compositions each containing 4,000 parts by weight of one of various alkylcarbamate compounds per million parts by weight of ultimate mixture are prepared, as in the foregoing examples. These aqueous compositions are employed in post-emergent applications for the control of crabgrass (Digitaria spp). In the treating operations, the compositions are applied as foliage sprays to plots of crabgrass. At the time of the applications, the plants are from 2 to 4 inches in height. The treatments are carried out with conventional spraying equipment, the applications being made to the point of run-off. Similar plots of crabgrass are left untreated to serve as checks.

After about two weeks, the plots are examined to ascertain what percent kill and control of the growth of crabgrass is obtained. The test compounds employed together with the results of the observations are set forth in the following table.

| Test compounds: | Percent kill and control of the growth of seeds and seedlings of crabgrass |
|---|---|
| Ethylene bis(butylnitrocarbamate) | 100 |
| Propylene bis(methylnitrocarbamate) | 98 |
| Pentamethylene bis(ethylnitrocarbamate) | 90 |
| Trimethylene bis(butylnitrocarbamate) | 98 |

At the time of the observations, the untreated check plots are found to support abundant stands of vigorously growing plants of crabgrass.

I claim:
1. Compound of the formula

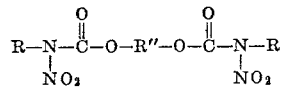

wherein R represents alkyl being of from 1 to 4, inclusive, carbon atoms; and R″ represents a hydrocarbonylene moiety selected from the group consisting of alkylene being of from 2 to 10, inclusive, carbon atoms, 2-butenylene, cyclohexylene, and cyclohexylenedimethylene.

2. Pentamethylene bis(ethylnitrocarbamate).
3. Propylene bis(methylnitrocarbamate).
4. Trimethylene bis(methylnitrocarbamate).
5. Tetramethylene bis(butylnitrocarbamate).

References Cited

UNITED STATES PATENTS

| 2,647,916 | 8/1953 | Kaiser | 260—482 XR |
| 2,706,678 | 4/1955 | Denny | 71—2.7 |
| 2,720,452 | 10/1955 | Denny | 71—2.7 |
| 3,105,848 | 10/1963 | Linder et al. | 260—471 |
| 3,178,470 | 4/1965 | Smith et al. | 260—471 |
| 3,264,083 | 8/1966 | Davies et al. | 260—482 XR |

FOREIGN PATENTS

| 918,882 | 2/1963 | Great Britain. |
| 935,671 | 9/1963 | Great Britain. |

OTHER REFERENCES

Cornman, Nat. Cancer Institute Journal, vol. 10 (1950), pp. 1123–38.

Curry et al., J. Am. Chem. Soc., vol. 73, 1951, pp. 5043–46.

LORRAINE A. WEINBERGER, *Primary Examiner.*

JAMES O. THOMAS, JR., RICHARD K. JACKSON, *Examiners.*

A. P. HALLUIN, *Assistant Examiner.*